US011469005B2

United States Patent
Loginov et al.

(10) Patent No.: US 11,469,005 B2
(45) Date of Patent: Oct. 11, 2022

(54) REACTOR CORE HAVING BOTH NUCLEAR FUEL AND A HEAT PIPE IN A MODULE LOCATED IN A SOLID NEUTRON MODERATOR

(71) Applicants: JOINT STOCK COMPANY "STATE SCIENTIFIC CENTRE OF THE RUSSIAN FEDERATION—INSTITUTE FOR PHYSICS AND POWER ENGINEERING NAMED AFTER A.I. LEYPUNSKY", g. Obninsk (RU); JOINT STOCK COMPANY "SCIENCE AND INNOVATIONS", Moscow (RU)

(72) Inventors: Nikolay Ivanovich Loginov, g. Obninsk (RU); Viktor Viktorovich Litvinov, g. Obninsk (RU); Aleksey Dmitrievich Krotov, g. Obninsk (RU)

(73) Assignees: JOINT STOCK COMPANY "STATE SCIENTIFIC CENTRE OF THE RUSSIAN FEDERATION—INSTITUTE FOR PHYSICS AND POWER ENGINEERING NAMED AFTER A.I. LEYPUNSKY", G. Obninsk (RU); JOINT STOCK COMPANY "SCIENCE AND INNOVATIONS", Moscow (RU)

( * ) Notice: Subject to any disclaimer, the term of this patent is extended or adjusted under 35 U.S.C. 154(b) by 0 days.

(21) Appl. No.: 16/627,737

(22) PCT Filed: Dec. 25, 2018

(86) PCT No.: PCT/RU2018/000869
§ 371 (c)(1),
(2) Date: Dec. 30, 2019

(87) PCT Pub. No.: WO2019/199200
PCT Pub. Date: Oct. 17, 2019

(65) Prior Publication Data
US 2021/0027900 A1    Jan. 28, 2021

(30) Foreign Application Priority Data

Apr. 13, 2018    (RU) .......................... RU2018113680

(51) Int. Cl.
  *G21C 15/257*    (2006.01)
  *G21C 1/12*    (2006.01)
  (Continued)

(52) U.S. Cl.
  CPC ............. *G21C 15/257* (2013.01); *G21C 1/12* (2013.01); *G21C 5/02* (2013.01); *G21C 3/322* (2013.01); *G21C 3/40* (2013.01); *G21C 5/12* (2013.01)

(58) Field of Classification Search
  CPC .......... G21C 15/257; G21C 1/12; G21C 5/02; G21C 3/322; G21C 3/40; G21C 5/12
  (Continued)

(56) References Cited

U.S. PATENT DOCUMENTS

| 3,205,147 A * | 9/1965 | Foure | G21C 15/04 |
| | | | 376/428 |
| 4,506,183 A * | 3/1985 | Morris | H01J 45/00 |
| | | | 165/274 |

(Continued)

OTHER PUBLICATIONS

Kusuma, "Passive cooling system in a nuclear spent fuel pool using a vertical straight wickless-heat pipe", International Journal of Thermal Sciences 126 (Jan. 2018): 162-171. (Year: 2018).*

(Continued)

*Primary Examiner* — Jack W Keith
*Assistant Examiner* — Daniel Wasil
(74) *Attorney, Agent, or Firm* — J. Miguel Hernandez; James R. Gourley; Carstens & Cahoon, LLP

(57) ABSTRACT

A nuclear reactor core includes at least one module, a solid neutron moderator, and liquid neutron moderator. Each module comprises a housing, at least one heat pipe, at least (Continued)

Figure 1:
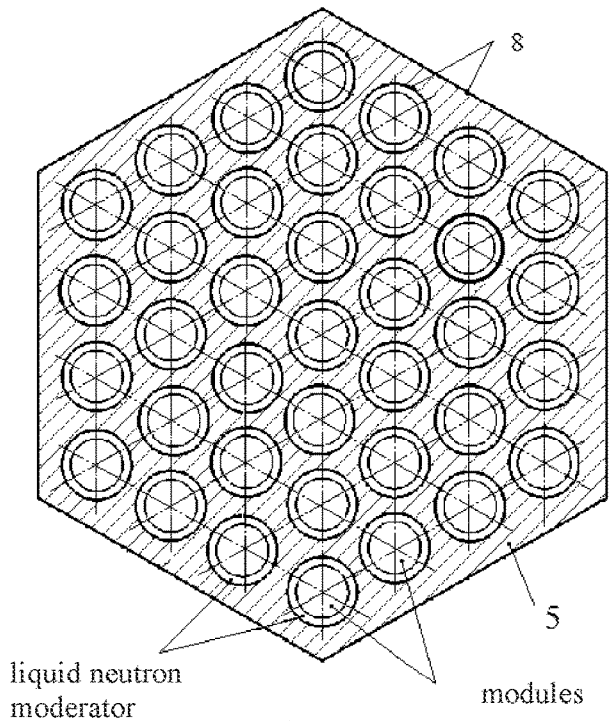
Figure 1:
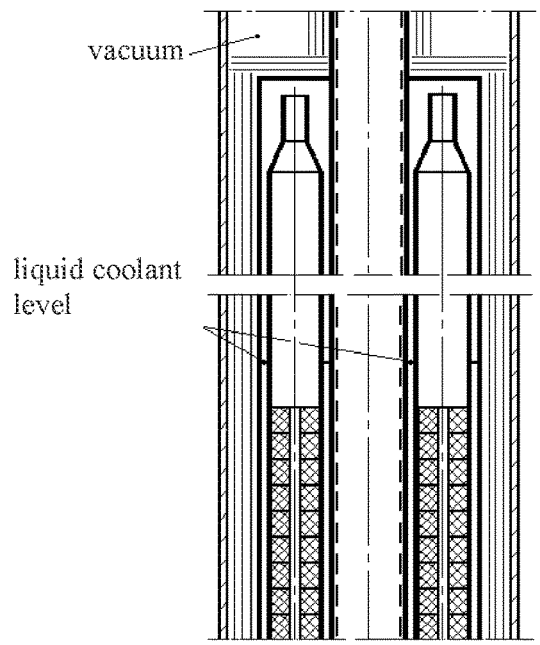
Figure 3:
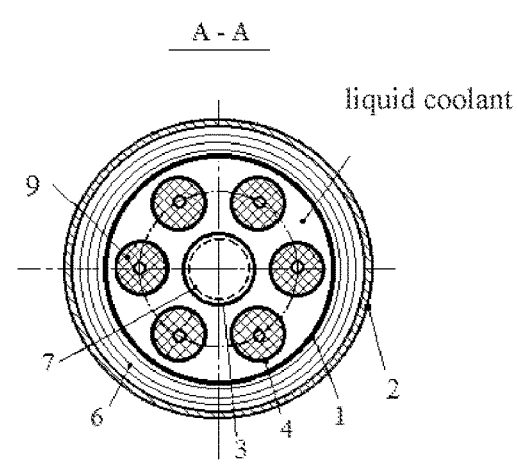
Figure 2:
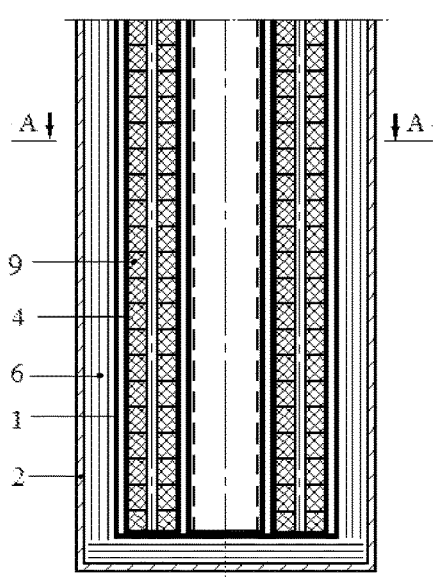

one fuel element, casing, and thermal insulation. The heat pipe comprises a housing, wick, and evaporating coolant. The fuel element includes a shell and nuclear fuel. An evaporation zone of the heat pipe and the fuel elements are enclosed by the casing. The casing is filled with a liquid coolant. Liquid metal, for example, lithium, calcium, lead, and/or silver, is used as the heat pipe coolant and the liquid coolant. The thermal insulation is arranged in a space between the casing and module housing. The solid neutron moderator has at least one hole, wherein at least one module is located. A space between the solid neutron moderator and module is filled with the liquid neutron moderator.

16 Claims, 1 Drawing Sheet

(51) Int. Cl.
*G21C 5/02* (2006.01)
*G21C 3/322* (2006.01)
*G21C 3/40* (2006.01)
*G21C 5/12* (2006.01)

(58) Field of Classification Search
USPC ................... 376/320, 321, 367, 427
See application file for complete search history.

(56) References Cited

U.S. PATENT DOCUMENTS

| | | | |
|---|---|---|---|
| 5,408,510 A * | 4/1995 | Ball | G21C 3/40 |
| | | | 376/367 |
| 8,987,579 B2 * | 3/2015 | Lu | G21C 15/257 |
| | | | 136/202 |
| 2005/0135542 A1 * | 6/2005 | Stellwag | G21C 15/28 |
| | | | 376/277 |

OTHER PUBLICATIONS

Zhang, "Conceptual design of megawatt class space heat pipe reactor power system", Atomic Energy Science and Technology 51, No. 12 (2017): 2160-2164. (Year: 2017).*

* cited by examiner

REACTOR CORE HAVING BOTH NUCLEAR FUEL AND A HEAT PIPE IN A MODULE LOCATED IN A SOLID NEUTRON MODERATOR

CROSS-REFERENCE TO RELATED APPLICATIONS

This application is a US 371 application from PCT/RU2018/000869 filed Dec. 25, 2018, which claims priority to Russian Application No. 2018113680 filed Apr. 13, 2018, the technical disclosures of which are hereby incorporated herein by reference.

The invention refers to nuclear energy and can be used in reactors with direct heat-to-electrical power conversion outside the core, particularly, thermophotovoltaic.

The core with heat pipes is known [Application for Invention "Mobile Fast Neutron Heat-Pipe-Cooled Reactor" US No. 2016/0027536 A1 published on 22 Jan. 2016].

According to the application specified, the reactor core contains the arrays of rod-type fuel elements incorporated into the metallic unit. The fuel elements comprise the nuclear fuel, upper and lower tampers and gaseous cavities above or below the tampers. The heat pipes comprise a tight housing filled with evaporating coolant and a wick. The heat pipes are located so that to transfer heat outside the core to the gaseous coolant—the gas turbine fluid (air or $CO_2$). The maximum temperature of the working fluid (air) at the turbine inlet is about 1,100 K.

The drawback of this technical solution is relatively low coolant temperature at the core outlet that does not allow for using the direct heat-to-electrical power conversion.

The closest to the technical essence of the applied technical solution is the fast nuclear reactor core SAIRS [M. S. El-Genk, J-M. P. Tournier, SAIRS—Scalable AMTEC Integrated Reactor Space Power System//Progress in Nuclear Energy, Vol. 45, No. 1, pp. 25-34, 2004].

The core includes 60 modules consisting of the heat pipe and 3 fuel elements. The modules are closely located and form a triangular pack. The fuel element shells are soldered to the heat pipe housing with rhenium three-edge packings that transfer heat to the heat pipe due to heat conductivity. Each fuel element has a gaseous cavity from the one end. The uranium nitride pellets with 83.7% concentration are used as fuel.

The drawback of this technical solution is relatively low coolant temperature (1,200 K) at the coolant outlet that does allow for using the thermovoltaic, thermionic and thermophotovoltaic power converters efficiently.

The object of invention is to eliminate the drawback specified, namely, to raise the coolant temperature at the core outlet.

The technical result is the increasing motor efficiency of the nuclear power plant and increasing scope of application of the core, particularly, for reactors with thermophotovoltaic power conversion.

To eliminate the specified drawback in the reactor core that includes the autonomous modules consisting of the fuel elements and heat pipes, it is offered to:
  additionally equip the reactor core with solid neutron moderator with holes;
  provide the core modules with housing and arrange in the holes of the solid neutron moderator;
  arrange the heat pipes inside the module housings;
  enclose the evaporation zone of the heat pipe and fuel elements into the casing filled with liquid coolant;
  arrange heat insulation in the space between the casing and housing;
  additionally fill the space between the modules and solid neutron moderator with liquid neutron moderator.

In particular reactor core versions, it is offered to:
  firstly, create vacuum in the inner cavity of the module;
  secondly, in the other particular case, fill the inner cavity of the module with low heat-conductivity gas, for example, xenon;
  thirdly, use water as the liquid neutron moderator;
  fourthly, in the other particular case, use the nonfreezing liquid, for example, alcohol aqueous solution, as the liquid neutron moderator;
  fifthly, use the liquid metal, for example, lithium, calcium, lead, silver, as the heat pipe coolant and liquid coolant of the casing.

The subject-matter of the invention is explained in the drawings where Pic. 1 represents the cross section of one of the reactor core versions, Pic. 2
  the longitudinal section of one of the reactor core module versions, Pic. 3—the cross section of one of the reactor core module versions. The following position designations are accepted for the pictures: 1—casing; 2—module housing; 3—heat pipe housing; 4—fuel element shell; 5—solid neutron moderator; 6—heat insulation; 7—wick; 8—solid moderator can; 9—nuclear fuel.

The substance of the invention is as follows.

The reactor core, including at least one module comprising at least one heat pipe configured with housing 3 and wick 7, and at least one fuel element consisting of shell 4 and nuclear fuel 9, is further provided with solid neutron moderator 5 with at least one hole, wherein at least one module is located, the heat pipe is inside the module housing, the heat pipe evaporation zone and fuel elements are enclosed into the casing 1 filled with the liquid coolant, there is the heat insulation 6 in the space between the casing and module housing 2, the space between the solid neutron moderator 5 and module is filled with the liquid neutron moderator.

The solid neutron moderator 5 is made of beryllium and enclosed into cover 8, for example. The solid moderator is intended to ensure the neutron heat spectrum. At least one core module is placed into the vertical holes of the solid neutron moderator 5. The solid moderator 5 can 8 is made, for example, of zirconium alloy and designated to prevent chemical interaction of the solid moderator 5 and liquid moderator.

The core module is configured as the housing 2 made of the low-capture material, for example, zirconium alloy. There is the vacuum or low heat-conductivity inert gas, for example, xenon, inside the module housing 2. The vacuum or inert gas provide for efficient heat insulation 6 and prevent the heat pipe 3 housing from oxidation.

The heat pipe consists of the heat pipe housing 3, wick 7, and comprises the liquid metal coolant. The heat pipe is for removing the heat emitted in the fuel elements out of the reactor core. The heat pipe housing 3 is made of refractory metal, for example, molybdenum, niobium, vanadium or their alloys. The heat pipe evaporation and fuel elements are enclosed into casing 1 filled with liquid coolant.

The liquid metal, for example, lithium, calcium, lead, silver, are used as the heat pipe coolant and liquid coolant of the casing 1.

The space between the casing 1 and module housing 2 is provided with the heat insulation 6 made of several layers of the refractory metal foil, for example, molybdenum or niobium The heat insulation is for prevention of heat leak via the module 2 housing to the liquid moderator.

The fuel element consists of the refractory metal shell 4 and nuclear fuel 9. The nuclear fuel 9 comprises the fissible material—uranium and (or) plutonium, for example, in the form of dioxide, nitride, carbonitride. The nuclear fuel of all fuel elements forms a critical amount necessary for fission reaction.

The liquid neutron moderator is in the annular regions between the modules and solid neutron moderator 5. It is intended for adding to the neutron moderation with the solid neutron moderator and ensuring the fission reaction on heat neutrons. In addition, the liquid neutron moderator functions as the coolant cooling down the solid neutron moderator and module housing. The water or the fluids not freezing at minus temperatures, for example, minus 40° C., are used as the liquid moderator.

The reactor core operates as follows.

The fission reaction with heat release occurs in the fuel element nuclear fuel 9. The released heat is transferred via the fuel element shell 4 and liquid coolant filling the casing 1 to the heat pipe housing 3. The heat pipe coolant is evaporated from the wick 7, the coolant vapour fills the inner space of the heat pipe housing 3, removes the heat of evaporation out of the reactor core to the power converter, condensates there and returns through the wick 7 to the heat pipe evaporation zone. The heat transfer by the evaporating coolant occurs practically without the temperature fall between the heat source and consumer that provides for relatively high (1,500-1,800K) temperature not only at the reactor core outlet but also in the power converters location. This provides for higher motor efficiency of the nuclear power plant and increasing scope of application of such plants.

The solid neutron moderator 5, together with the liquid neutron moderator, provides for nuclear fission reaction on heat neutrons. The liquid neutron moderator also functions as the coolant cooling down the solid neutron moderator. Due to the heat insulation 6, the heat leaks via the module 2 housing are minimized, that is why the liquid neutron moderator has low temperature. This provides for using the water or alcohol aqueous solutions at atmospheric pressure as the liquid moderator.

Particular version of the reactor core.

The solid neutron moderator 5 is made of several beryllium discs with the diameter of 1,000 mm and total height of 700 mm, with 108 holes of 70 mm diameter, and is entirely enclosed by the E110 zirconium alloy can. The holes of the solid neutron moderator incorporate the modules, one per each hole. The water is used as the liquid neutron moderator. The holes in the solid neutron moderator 5 with the modules are arranged in the points of triangular lattice and the reactor core is generally hexagon-shaped.

The reactor core module is made of the E110 zirconium alloy in the form of the tight cylindrical housing 2 with the approximate diameter of 60 mm and thickness of 1-2 mm. The heat pipe is placed inside the module housing.

The heat pipe housing 3 with the approximate outer diameter of 20 mm is made of molybdenum. The inner surface of the heat pipe housing 3 is provided with the wick 7 made of the two-layered molybdenum lattice with the square cell of about 40 μm. The wick 7 is filled with liquid lithium. The heat pipe evaporation zone is made 500 mm high and, together with six fuel elements, is enclosed into the casing 1 with the outer diameter of 47 mm and filled with liquid lithium. The casing 1 and fuel element shells 4 are molybdenum. The space between the casing 1 and module 2 housing incorporates the screen vacuum heat insulation 6 that is made of four-layered molybdenum and five-layered zirconium foil. The module housing has the vacuum with the residual gas pressure of no more than $10^{-1}$ Pa.

The fuel element shell 4 with the outer diameter of 13 mm and wall thickness of 1 mm is made of molybdenum, filled with the nuclear fuel 9 pellets of uranium dioxide with 19.75% concentration and pressurized by the upper and lower plugs. The fuel column is 500 mm high. To increase the radial heat conductivity of the fuel column, thin molybdenum washers are placed between the fuel pellets. The fuel pellets have the central holes with the approximate diameter of 3 mm for gaseous fission products removal to the cavity above the nuclear fuel 9. The total number of fuel elements in the core makes 432. With the core thermal power of 1,200 kW, the average power of a fuel element is about 2.8 kW, and the module power removed by the heat pipe is about 16.8 kW. The design operating temperature of the fuel element shell 4 is 1,525 K. $Li^7$ is used as the heat pipe coolant, and the water at atmospheric pressure as the liquid moderator.

The advantages of the proposed reactor core as compared to the closest technical solution consists in the coolant temperature raise at the core outlet from 1,200 K to 1,500 K and higher, that leads to the increasing motor efficiency of the nuclear power plants. In addition, this provides for increasing scope of application of the core, in particular, for reactors with thermophotovoltaic power conversion.

LIST OF TERMS

1. Casing
2. Module housing
3. Heat pipe housing
4. Fuel element shell
5. Solid neutron moderator
6. Heat insulation
7. Heat pipe wick
8. Solid moderator can
9. Nuclear fuel
+Water (not numbered in the Fig.)
+Liquid coolant
+Coolant vapour
+Liquid neutron moderator
Core=solid neutron moderator+core module+liquid neutron moderator.
Core module=module housing+heat pipe+fuel elements+heat insulation
Heat pipe=heat pipe housing+heat pipe wick+coolant.
Fuel element=shell+fuel+fuel element wick
Reactor Core:
" . . . 2. The core is a reactor part that incorporates the nuclear fuel, moderator, absorber, coolant, reactivity members, and structural elements intended for ensuring the controlled fission chain reaction and heat transfer to the coolant . . . "
Decree of the Federal Environmental industrial and Nuclear Supervision Service of Russia No. 4 dated Oct. 12, 2007 "On approval and introduction of the federal standards and regulations of the nuclear power use "Nuclear Safety Regulations. NP-082-07" (Registered in the RF Ministry of Justice under No. 10951 dated 21 Jan. 2008) © Consultant Plus, 1997-2017

The invention claimed is:
1. A reactor core, the reactor core comprising:
a solid neutron moderator comprising at least one hole;
a liquid neutron moderator; and
at least one module;
each module of the at least one module comprising:
a module housing;
thermal insulation positioned within the module housing;
a casing filled with liquid coolant, the casing being positioned within the module housing;

at least one heat pipe having an evaporation zone; and at least one fuel element, each fuel element of the at least one fuel element comprising a shell and nuclear fuel;

each module of the at least one module being located within a respective hole of the at least one hole of the solid neutron moderator;

the at least one heat pipe being located inside the module housing;

the evaporation zone of the at least one heat pipe and the at least one fuel element being enclosed by the casing filled with the liquid coolant;

the thermal insulation being located in a space between the casing and the module housing; and a space between the solid neutron moderator and each module of the at least one module being filled with the liquid neutron moderator.

2. The reactor core according to claim 1 characterized in that a module of the at least one module comprises an inner cavity and a vacuum, and the vacuum is located in the inner cavity of the module.

3. The reactor core according to claim 1 characterized in that a module of the at least one module comprises an inner cavity and a gas, the inner cavity being filled with the gas.

4. The reactor core according to claim 1 characterized in that the reactor core comprises a heat pipe coolant for a heat pipe of the at least one heat pipe, the heat pipe coolant being at least one liquid metal.

5. The reactor core according to claim 1 characterized in that the liquid neutron moderator is water.

6. The reactor core according to claim 1 characterized in that the liquid neutron moderator is nonfreezing liquid, at minus 40° C.

7. The reactor core according to claim 6 characterized in that the nonfreezing liquid is an alcohol aqueous solution.

8. The reactor core according to claim 3 characterized in that the gas is inert.

9. The reactor core according to claim 3 characterized in that the gas is xenon.

10. The reactor core according to claim 4 characterized in that the at least one liquid metal is selected from the group consisting of lithium, calcium, lead, and silver.

11. The reactor core according to claim 4 characterized in that the at least one liquid metal comprises a plurality of liquid metals.

12. The reactor core according to claim 11 characterized in that the plurality of liquid metals comprises metals selected from the group consisting of lithium, calcium, lead, and silver.

13. The reactor core according to claim 1 characterized in that the at least one module comprises a plurality of modules and the at least one hole comprises a plurality of holes, each module of the plurality of modules being positioned within a respective hole of the plurality of holes.

14. The reactor core according to claim 13 characterized in that the at least one fuel element of each module of the at least one module comprises a plurality of fuel elements, each fuel element of the plurality of fuel elements comprising a shell and nuclear fuel.

15. The reactor core according to claim 14 characterized in that each fuel element comprises a cavity for gaseous fission products of the respective nuclear fuel of the fuel element.

16. The reactor core according to claim 15 characterized in that the at least one heat pipe for each module of the at least one module comprises a single heat pipe.

* * * * *